Sept. 9, 1969      M. R. KIMBER      3,465,797
WEDGE-CUTTING FIXTURE FOR A TABLE SAW
Filed July 7, 1967
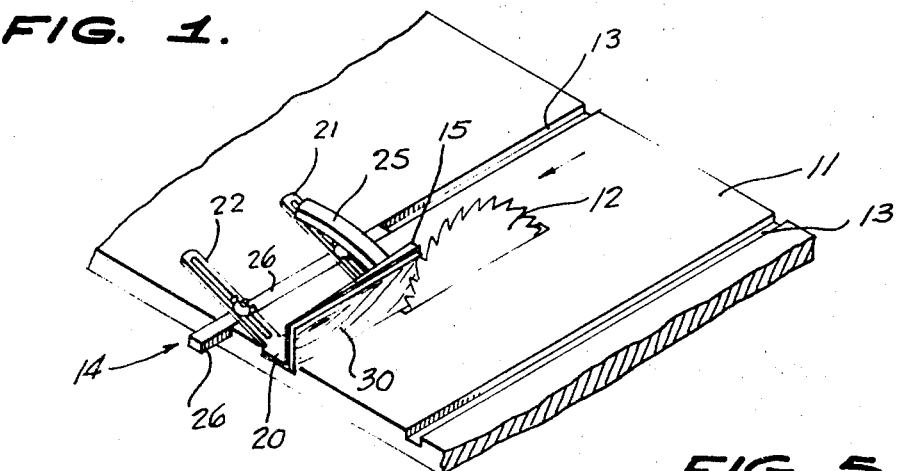
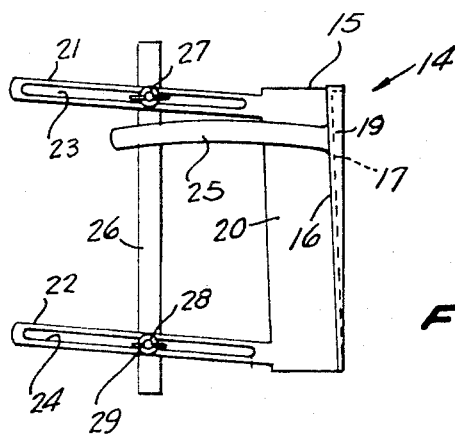
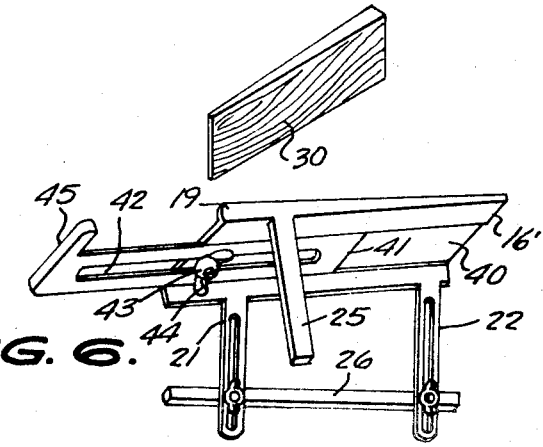
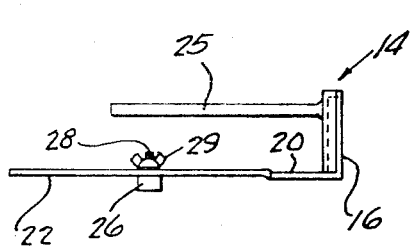
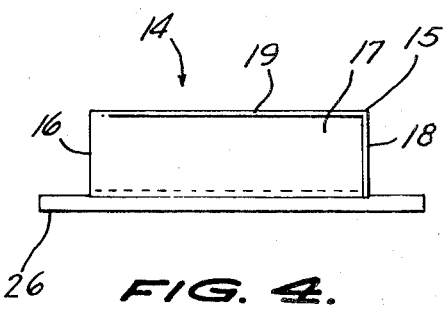
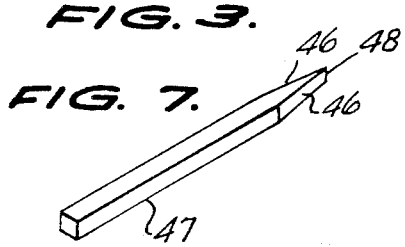
INVENTOR.
MELVIN R. KIMBER,
BY
Berman, Davidson & Berman
ATTORNEYS.

United States Patent Office 3,465,797
Patented Sept. 9, 1969

3,465,797
WEDGE-CUTTING FIXTURE FOR A TABLE SAW
Melvin R. Kimber, 1701 Aspen St.,
Fort Collins, Colo. 80521
Filed July 7, 1967, Ser. No. 651,724
Int. Cl. B27b 27/08
U.S. Cl. 143—169    6 Claims

ABSTRACT OF THE DISCLOSURE

A wedge-cutting fixture for a table saw. The fixture consists of a vertical abutment wall recessed to receive the corner of a block. The wall has a horizontal bottom flange provided with a pair of parallel longitudinally slotted arms. The arms are adjustably secured by bolts and wing nuts on a crossbar, which is slidably receivable in a fence groove of a table saw. The abutment wall has a horizontally outwardly projecting handle for moving the fixture in a direction to push a block on the saw table against the associated circular saw blade and thus cut a wedge.

---

This invention relates to woodworking tools, and more particularly to a fixture for use with a table saw for the purpose of cutting wedges.

The main object of the invention is to provide a novel and improved wedge-cutting fixture for a table saw, said fixture being simple in construction, being adjustable to provide wedges of various different inclinations, and enabling wedges to be made rapidly and with minimum effort.

A further object of the invention is to provide an improved wedge-cutting fixture for use with a conventional table saw, said fixture being inexpensive to manufacture, being durable in construction, being safe to use, and providing economical utilization of materials in cutting wedges.

Further objects and advantages of the present invention will become apparent from the following description and claims, and from the accompanying drawing wherein:

FIGURE 1 is a perspective view of a portion of the top of a table saw showing a wedge-cutting fixture according to the present invention installed on the saw table and illustrating the manner in which it is employed to cut a wedge.

FIGURE 2 is a top plan view of the wedge-cutting fixture of FIGURE 1.

FIGURE 3 is an end elevational view of the wedge cutting fixture of FIGURES 1 and 2.

FIGURE 4 is a front elevational view of the fixture of FIGURES 1, 2 and 3.

FIGURE 5 is a perspective view of a typical wedge formed by means of the fixture shown in FIGURES 1, 2, 3 and 4.

FIGURE 6 is a perspective view of a modified form of wedge-cutting fixture according to the present invention, for use in cutting relatively long wedges or survey stakes.

FIGURE 7 is a perspective view of a typical stage formed by employing the fixture of FIGURE 6.

Referring to the drawing, 11 designates the table of a conventional table saw, said saw being provided with the rotary cutting blade 12 and being formed with a pair of fence grooves 13, 13 parallel to the plane of blade 12 and located on opposite sides thereof. Designated generally at 14 is a wedge-cutting fixture constructed in accordance with the present invention. The fixture 14 comprises a generally angle-shaped body 15 having a vertical abutment wall 16 which is formed with a generally wedge-shaped recess 17 defining a transverse end flange 18 and a horizontal top flange 19. The recess 17 is thus adapted to receive the corner portion of a generally rectangular wooden block to be cut up to form one or more wedges.

Wall 16 has a horizontal bottom flange 20 which is integrally-formed with a pair of parallel longitudinally slotted arms 21 and 22, the longitudinal slots being shown respectively at 23 and 24. Rigidly connected to and projecting outwardly from the upper portion of the upstanding wall 16 is an arcuately curved, substantially horizontal handle 25 which is located adjacent to and above the longitudinally slotted arm 21, as shown in FIGURE 2.

The arms 21 and 22 are adjustably secured to a rigid crossbar 26 which is slidably receivable in a fence groove 13 in the manner shown in FIGURE 1. Thus, the bar 26 may be provided with a pair of upstanding studs 27 and 28 which are loosely receivable in the slots 23 and 24 so that the arms 21 and 22 may be rotated to some extent with the studs 27 and 28 received in the slots 23 and 24, thus enabling the wall 16 to be adjusted pivotally to a desired wedge angle with respect to the plane of the saw blade 12. Wing nuts 29 are threaded on the studs 27 and 28 and are clampingly engageable on the arms 21 and 22 to lock body 15 in a desired position of angular adjustment with respect to bar 26.

In using the fixture, body 15 is first adjusted relative to bar 26 to the desired angular position thereof, and the bar 26 is then inserted in the fence groove 13 in the manner illustrated in FIGURE 1. The wooden block is then engaged in the recess 17 with the corner portion thereof in abutment with the vertical end flange 18 of abutment wall 16 beneath the horizontal top flange 19 of the recess 17. This procedure is performed with the fixture and block at the right side, namely, the feed side of saw blade 12, as viewed in FIGURE 1.

It will be understood that the body 15 is adjusted to the correct position to provide a wedge of the desired thickness, as well as having a desired inclination.

After the block and fixture have been positioned, as above-described, the block is pushed against the blade 12 by pushing on the block with one hand, and pushing on the handle 25 with the other in the direction shown by the arrow in FIGURE 1, whereby the block is pushed past the saw blade 12 causing the blade to cut the desired wedge, shown at 30. The wedge 30 may then be removed and the procedure may be repeated, if so desired, to form an additional wedge.

The slots 23 and 24 may be of sufficient width to provide the amount of play required to adjust body 15 angularly through a range sufficient to set up the fixture for the desired angular range of wedges to be cut.

In the modification shown in FIGURE 6, the vertical abutment wall, shown at 16', is formed with a longitudinal groove 40 in which is slidably positioned an extension bar 41 having a longitudinal slot 42. A stud 43 rigidly secured to the wall 16' at the end portion of groove 40 extends through slot 42 and is provided with a clamping wing nut 44. The free end of the bar 41 is provided with an enlarged abutment portion 45 whose inside face is flush with the inside face of wall 16'. Bar 41 may be extended, as required, to support a long block for forming a relatively long wedge. The fixture of FIGURE 6 may also be employed in making the tapered cuts 46, 46 at the ends of a typical survey stage 47, shown in FIGURE 7, to provide a sharp point 48 at the end of the stake.

While specific embodiments of an improved wedge-cutting fixture for a table saw have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A wedge-cutting fixture for a table saw of the type having a table provided with a fence groove spaced laterally from and extending parallel to the plane of the saw blade of the table saw, said fixture comprising a vertical abutment wall, a horizontal bottom flange rigidly secured to the bottom margin of said abutment wall and extending laterally therefrom, a pair of spaced laterally extending horizontal arms rigidly secured to the outer longitudinal edge of said flange, a crossbar underlying said arms and being slidably engageable in the fence groove of a saw table, means adjustably securing said arms to said crossbar, whereby the angular position of the abutment wall can be adjusted relative to the crossbar, and means on the vertical abutment wall shaped to substantially interlock with the corner portion of a wood block, and wherein the means to interlock with the corner portion of a wood block comprises a recess formed in the abutment wall defining a corner-receiving socket.

2. The wedge-cutting fixture of claim 1, and wherein said arms are formed with longitudinal slots and said crossbar is provided with upstanding studs loosely receivable in said slots, and wherein the means adjustably securing the arms to the crossbar comprises respective clamping nuts on the studs for clamping said arms to said crossbar.

3. The wedge-cutting fixture of claim 2, and wherein said arms are substantially parallel.

4. The wedge-cutting fixture of claim 3, and a laterally projecting handle member rigidly secured to the upper portion of said abutment wall and extending toward said crossbar.

5. The wedge-cutting fixture of claim 4, and wherein said handle member is located adjacent and above one of the arms.

6. The wedge-cutting fixture of claim 5, and wherein said socket comprises a transverse vertical rear flange and a horizontal top flange on the vertical abutment wall defining a substantially right-angled enclosure to receive said corner of a wood block.

References Cited

UNITED STATES PATENTS 13,670  10/1855  Worden _____ 143—169

FOREIGN PATENTS 262,519  9/1965  Australia.

ANDREW R. JUAHASZ, Primary Examiner

Z. R. BILINSKY, Assistant Examiner

U.S. Cl. X.R.

143—51, 59